United States Patent [19]

Andrews

[11] 4,363,420
[45] Dec. 14, 1982

[54] APERTURE PLUGS

[75] Inventor: Sydney A. Andrews, Stapleford, England

[73] Assignee: TRW Inc., Cleveland, Ohio

[21] Appl. No.: 229,896

[22] Filed: Jan. 30, 1981

[51] Int. Cl.³ .................................................. B65D 39/00
[52] U.S. Cl. ..................... 220/307; 220/359; 220/364
[58] Field of Search ............... 220/307, 308, 359, 352, 220/DIG. 19, 364; 215/294, 358

[56] References Cited

U.S. PATENT DOCUMENTS 3,990,604 11/1976 Barnett et al. ................... 220/308 X
4,091,962  5/1978 Van Buren ...................... 220/307 X
4,290,536  9/1981 Moreh .................................. 220/307

Primary Examiner—George T. Hall
Attorney, Agent, or Firm—James R. O'Connor

[57] ABSTRACT

A plug for sealing an aperture in a panel includes a body portion adapted to close the aperture, a flange portion adapted to overlie an upper surface region adjacent the aperture, one or more insert portions adapted for insertion through the panel in contact or close adjacency to the edge surface of the aperture, and a body of sealant material in the form of a ring in contact with the under surface of the flange portion. The sealant material has the property of flowing when heated to an operating temperature lower than the melting point of the plug material, and the insert portion or portions of the plug and the body of sealant are formed so as to cause at least part of the sealant, upon being heated, to flow and adhere between the edge surface of the panel aperture and at least part of an insert portion.

6 Claims, 5 Drawing Figures

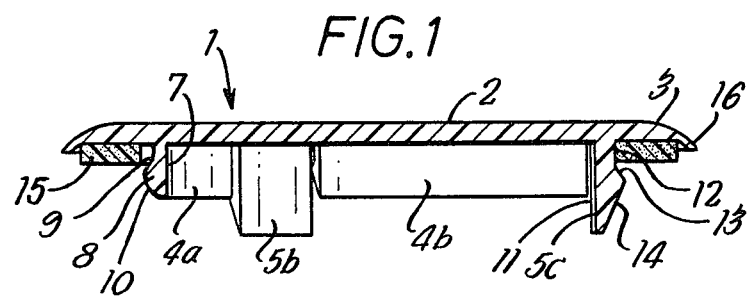
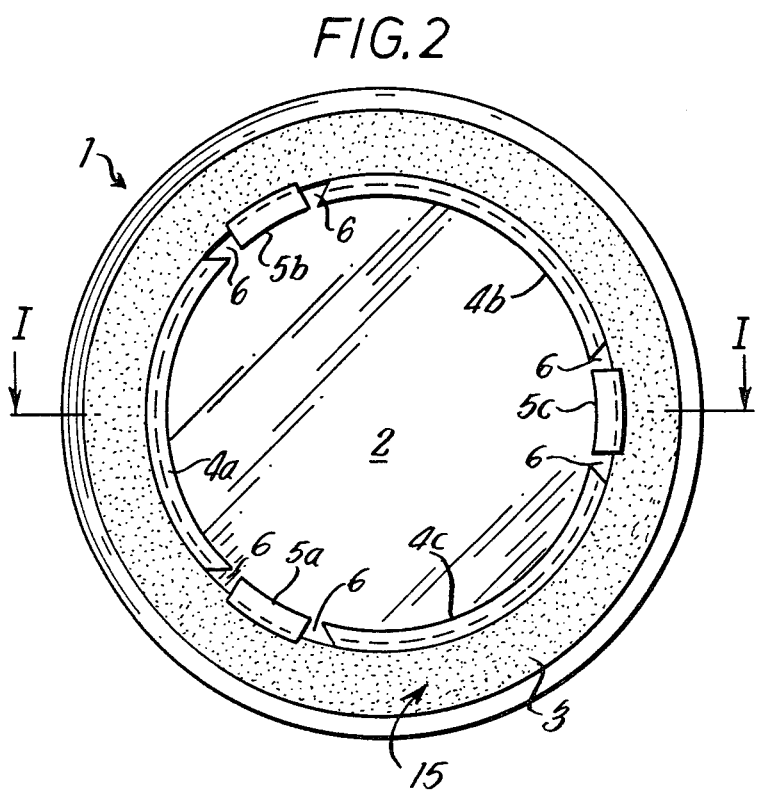
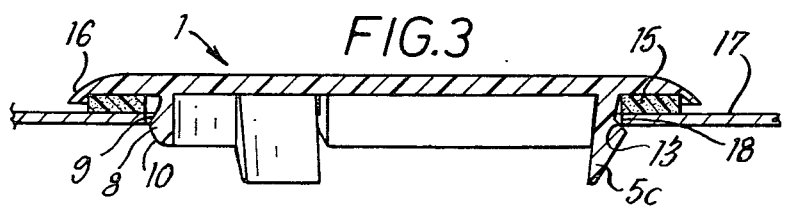

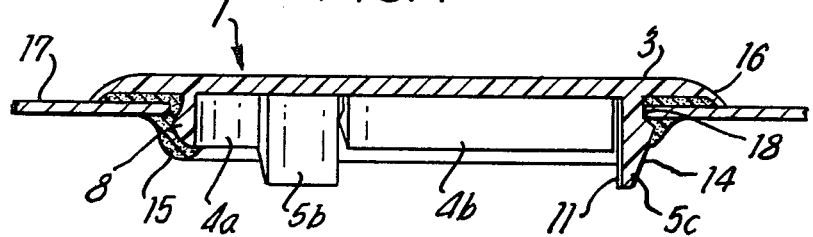
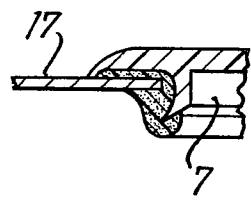

APERTURE PLUGS

FIELD OF THE INVENTION

The present invention relates to a plug for closing and sealing an aperture in a panel and to a method of closing and sealing an aperture in a panel utilizing a plug.

BACKGROUND OF THE INVENTION

The invention has particular utility in closing paint drainage holes in motor car bodies. Such apertures are formed more usually in the floor plan of a motor vehicle to allow excess paint to drain before the body is transferred to the paint oven where the paint is dried. The apertures can vary from quite a small size up to e.g. 90 mm diameter and they may be of a variety of shapes for instance circular, elliptical or oblong. Such plugs are commonly called "floor plugs" although not all such apertures are necessarily in the floor of the vehicle. Recent examples on floor plugs are described in British Pat. Nos. 1,466,563 and 1,466,564. In such plugs a body of sealant material is used between the plugs and the upper surface of the panel which flows at least to a limited extent when subjected to high temperature, normally in the paint oven. Sufficient sealant material is used for this to flow when heated to fill any irregularities in the panel region adjacent the plug, and in the adjacent plug surface, to ensure a complete seal.

While these plugs are generally successful in most applications, such plugs, particularly in the floor of the panel, are subjected to very considerable bombardment especially from rain water during travel of the motor vehicle and failures occur. The sealant or adhesive in such adhered plugs is restricted to the upper surface of the panel and normally between this surface and a flange portion of the plug which overlies the surface.

The invention is aimed at improving the adhesion of aperture plugs generally and particularly floor plugs, to provide a secure fixing without complicating the insertion procedure. The insertion procedure of floor plugs has to be rapid and efficient. The plugs have to be inserted by an operative while the car bodies are moving on a conveyor system.

SUMMARY OF THE INVENTION

Essentially the invention relies upon causing at least a part of the sealant to flow into the aperture during the heating step and preferably to anchor against the under surface of the panel.

In one form the invention provides a method of sealing in an aperture in a panel a plug which has at least one insert portion, a flange portion having an under surface, and a body of sealant material in contact with the under surface of the flange portion wherein said sealant material has the property of flowing when heated to an operating temperature lower than the melting point of the plug material, said method comprising inserting said at least one insert portion into said aperture, heating said sealant material and causing it to flow and adhere between the edge surface of said aperture and at least part of said at least one insert portion, and allowing said sealant material to cool.

For example, the plug is preferably heated to cause the sealant material to flow to fill any irregularities in the adjacent surfaces of the flange portion of the plug and panel, and to flow within or through the aperture so as to engage between the insert portion(s) of the plug and the edge surface of the aperture.

Preferably at least a part of the sealant flows through the aperture and is caused to adhere against the under surface of the panel.

In another form of the invention there is provided a plug for an aperture in a panel comprising:

at least one insert portion adapted for insertion into the aperture, a flange portion having an under surface adapted to overlie an upper surface region of the panel adjacent the aperture, and a body of sealant material in contact with said under surface of said flange portion, said sealant material having the property of flowing when heated to an operating temperature lower than the melting point of the plug material, and said at least one insert portion and said body sealant material being arranged such that at least a portion of said sealant material upon being heated when said at least one insert portion is inserted in the aperture, flows and adheres between the edge surface of the aperture and at least part of said at least one insert portion.

Preferably the insert portion or portions are so formed that at least part of the heated sealant is directed to flow against and adhere to the under surface of the panel.

Preferably the plug includes an insert portion in the form of a continuous or discontinuous neck. In a preferred embodiment, a lower part of such neck projects outwardly from the remainder at a maximum point in alignment with the edge of the aperture. This causes the flowing sealant to be directed around the edge of the aperture and against the underside of the panel.

The insert portion may also include means adapted to maintain the sealant under compression at least until it is heated. This will ensure that the sealant is squeezed so that upon being heated it flows to fill the irregularities in the surfaces and is forced at least in part through the aperture.

Thus the insert portion may include resiliently flexible legs, which may be located within discontinuities in the neck. Such legs preferably have an outward and downward sloping portion adapted to engage the edge of the aperture upon insertion of the plug to resiliently clamp the plug to the panel and maintain the sealant under pressure.

The shape of the body portion of the plug will be determined by the shape of the aperture to be sealed, which may vary and will not necessarily be circular.

BRIEF DESCRIPTION OF THE DRAWINGS

Embodiments of the invention are hereafter described with reference to the accompanying drawings, in which:

FIG. 1 is a cross-sectional view of a plug in accordance with the invention,

FIG. 2 is a bottom plan view of the plug of FIG. 1,

FIG. 3 is a view similar to FIG. 1 of part of the plug engaged through a panel prior to being heated, FIG. 4 is a view similar to FIG. 1 of the plug after being bonded to the panel, and FIG. 5 is a view similar to part of FIG. 4 showing an alternative form of neck portion.

DESCRIPTION OF PREFERRED EMBODIMENTS

Referring to FIGS. 1 and 2 there is shown a plug 1 having a body portion 2 and a flange portion 3 continuous with the body portion 2, portions 2 and 3 constituting a continuous circular plate. Extending downwardly from the under surface of the plate at the junction of the body portion 2 and flange portion 3 are three neck portions 4a, 4b, and 4c. Between every two adjacent neck portions is one of three retaining legs 5a, 5b and 5c. The legs are attached to the remainder of the plug only at their upper extremities, to ensure resilient flexibility and they lie close to the neck portions but are spaced therefrom by narrow channels 6 which extend upwardly to the under surface of the plate (2,3).

Since each neck portion is similar to the others and likewise each leg is similar to the other legs, only one of each will be described. The neck portion 4a has a cylindrical inner surface 7 at right angles to the underside of the body portion 2, but its outward surface is shaped to provide an outward projection 8 formed by a thickening of the neck to an outwardly directed point, as the portion is viewed in cross-section. As shown in FIG. 1 the upper surface 9 of the projection is concavely curved and the lower surface 10 is convexly curved.

The inner surfaces 11 of the legs are again cylindrical and aligned with the inner surfaces of the neck portions. The outer surfaces of the legs have a neck surface 12 parallel to the surface 11, and a downwardly and outwardly oblique shoulder 13 joining with a downwardly and inwardly oblique surface 14 which tapers to meet the surface 11.

The flange portion 3 is rebated on its underside to house a sealant body 15 which is clamped between the edge portion 16 of the flange portion 3 and the neck surface 12 of each leg. The sealant body 15 may be adhered in place if desired during manufacture by a heat softening step at a relatively low temperature. It is sufficient only that it does not come loose during handling and storage.

It will be observed that the extremity of the projection 8 of each neck portion is generally in alignment with the neck surfaces 12 of the legs.

FIG. 3 shows a part of the plug immediately after insertion into an aperture 18 in a panel indicated as 17. In this condition, the legs 5a, 5b 5c are flexed inwardly so that the edge of the panel engages against the upper oblique shoulder 13 of each leg which clamps the flange portion 3 of the panel and the sealant downwardly against the panel 17 and maintains the sealant under compression until it is heated. The maximum or peak diameter of the neck portions 4a, 4b, 4c is equal to or slightly less than the diameter of the aperture 18 and is positioned approximately in line with the under-surface of the panel so as to substantially close the aperture.

When the assembly is heated, e.g. in a paint oven, the sealant melts and flows and in so doing fills the irregularities in the panel and the flange portion and also flows into the spaces between the edge of the panel and the neck portions as shown in FIG. 4. This out-flowing of the sealant reduces the volume of sealant on the upper surface of the panel. As this occurs the shoulders 13 ride down the underside edge of the panel aperture so that the peak diameter of the neck portions 4a, 4b, 4c also move downwardly opening up a gap through which the sealant can flow freely. At the same time, the edge portions 16 of the flange portions of the plug are brought down into engagement with the upper surface of the panel 17. The released sealant 15 flows through the aperture and fills the spaces between the edge of the panel and the neck portions of the plug. Some of the sealant is caused by the concavely curved surfaces 9 of the neck portions to flow against the underside of the panel. Furthermore some of the sealant flows through the channels 6 between the neck portions and the retaining legs and engages the shoulders 13 of the legs and the underside of the panel in the vicinity of the legs. In this way a complete seal is formed not only between the top surface of the panel and the plug but also all around the edge surface of the aperture and the adjacent underside region of the panel. This in turn forms a very secure anchorage for the plug when the assembly has cooled.

It is not necessary for the neck regions to be shaped as in FIG. 4. FIG. 5 shows a slightly different cross-section in which the chamfer between the inner surface 7 and the outer surfaces is outward and downward. This enables part of the sealant to flow under the projection to form a more secure anchorage to the neck portion.

The preferred sealant is an EVA material (ethylene vinyl acetate), which can be compounded to flow at a variety of temperatures. The normal temperature in a paint sealing oven is between 140° and 170° C. and a suitable flow point for the EVA material would be from 100° to 135° C. The material is present in a fairly substantial volume sufficient to fill the various channels as shown in the drawings. A material which tends to shrink on being heated is preferably avoided. Many other materials would be suitable as the sealant, e.g. soft polyethylene. If desired a thermosetting material could be used, if necessary with a blowing agent. Certain PVC plastisols containing blowing agents and which tend to expand and cross-link when heated, may be used, e.g. a material as sold by W. G. Grace & Co. under the name PLASTICOLE compound No. 1268. Polyurethane compositions containing blowing agents may also be used, but in general it has been found that a low softening thermoplastic material having good flowing and adhesive properties to metal and other plastic materials is to be preferred.

The plug is preferably moulded from a suitable plastic material, which should be of good impact strength and abrasion resistance. A suitable material is Nylon (Trademark) 66.

However in general the invention is not limited to plugs moulded from plastics materials and is not limited to the embodiment shown as regards structure. It may be applied to other known types of plug used, e.g. in vehicle body floor apertures, e.g. a snap-fit type as described in British Pat. No. 1,350,558, in which part of the plug engages underneath the panel when inserted, or a plug as described in British Pat. No. 735,044 in which a tool is used to dimple or spin a portion of the plug to engage under the panel. The invention is also generally applicable to the type of plug fitted with spring legs as described in British Pat. No. 1,466,563. Clearly it is not necessary that the sealant engages in the aperture or under the panel in all regions provided that a complete seal is obtained and a secure anchorage is afforded. In plugs provided with a continuous neck or collar region which is inserted through the aperture, provision may be necessary in the form of recesses or channels, to allow part of the sealant to flow through the aperture into contact with the edge surface of the aperture.

It is not necessary for the sealant body to be confined (before insertion) to the flange region of the plug. In certain embodiments it may be desirable for at least part of the sealant body to project downwardly, e.g. against part of the insert portion so as to enter the panel aperture when the plug is inserted.

The plug may be provided with any suitable number of retaining legs. While the illustrated embodiment has three retaining legs equiangularly spaced around the plug body and is suitable for use in a circular hole it may be desirable to have a larger number of retaining legs if the plug is designed to be used in an elliptical or rectangular hole.

I claim:

1. A plug for an aperture in a panel comprising:
   an insert portion adapted for insertion into the aperture,
   a flange portion having an under surface adapted to overlie an upper surface region of the panel adjacent the aperture, and
   a body of sealant material in contact with said under surface of said flange portion,
   said insert portion comprising a plurality of neck portions, and a plurality of resiliently flexible elements arranged between said neck portions so as to be resiliently flexed during insertion of said insert portion into the aperture and so as, thereafter, to retain said insert portion within the aperture.

2. A plug according to claim 1, wherein said resiliently flexible elements comprise legs each having a retaining projection which is resiliently displaceable to permit insertion of said insert portion into the aperture and which is arranged to engage the panel and retain said insert portion in the aperture after insertion.

3. A plug according to claim 2, wherein each said projection has an inclined upper surface.

4. A plug according to claim 1, wherein said neck portions have projections arranged substantially to close the aperture from below when said insert portion has been inserted in the aperture.

5. A plug according to claim 4, wherein said body of sealant material is adapted to flow, upon being heated to an operating temperature lower than the melting point of the plug material, down said neck portions, whereby in use said projections drop below the panel, and thence over said projections to the under surface of panel.

6. A plug according to claim 4 or 5, wherein said projections have concavely curved upper surfaces.

* * * * *